Feb. 10, 1953 — L. A. HAUTAU — 2,627,647
INDEXING MACHINE
Filed June 14, 1951 — 6 Sheets-Sheet 1

INVENTOR.
LLEWELLYN A. HAUTAU
BY Edward M. Apple
ATTORNEY

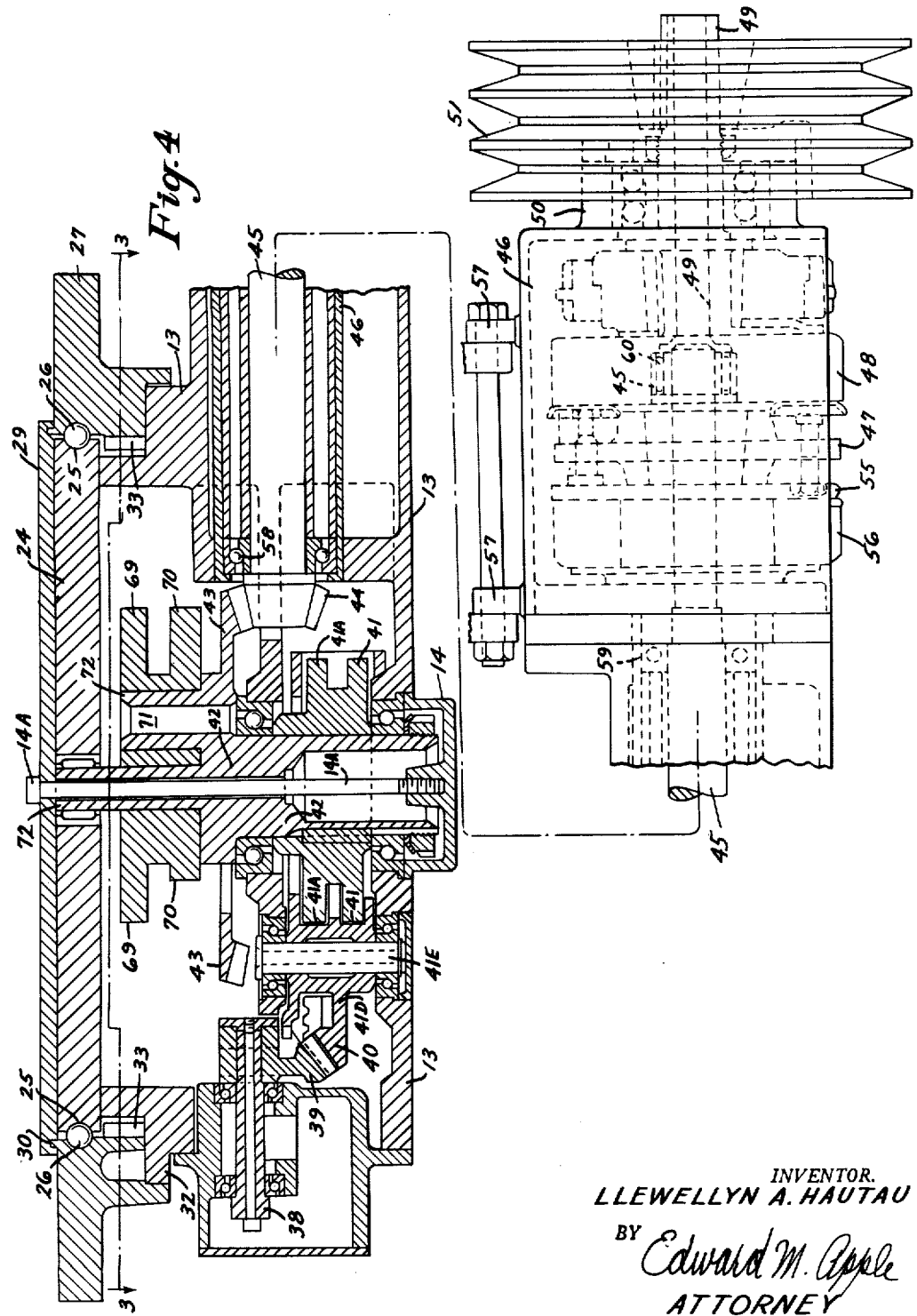

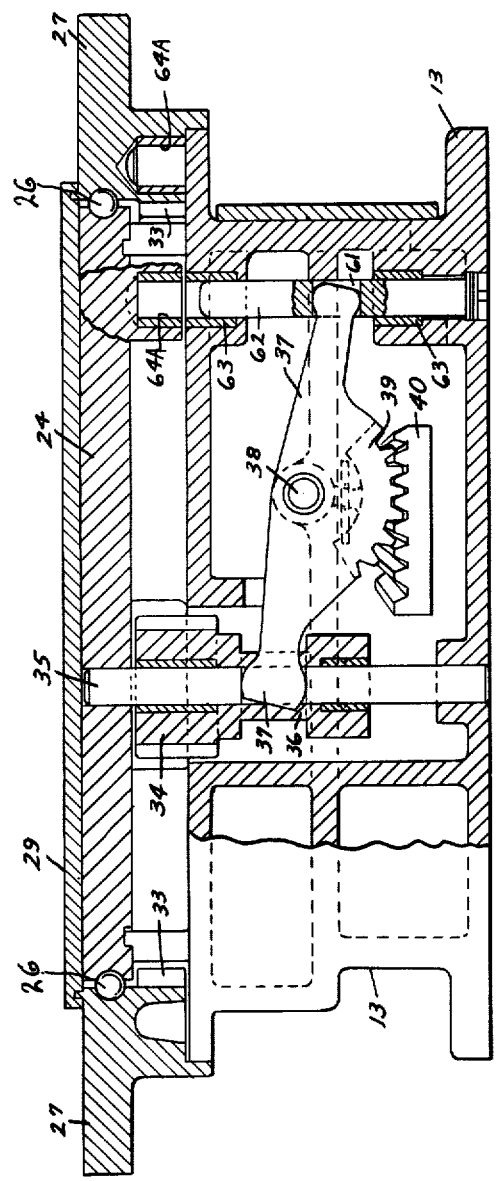

Feb. 10, 1953   L. A. HAUTAU   2,627,647
INDEXING MACHINE
Filed June 14, 1951   6 Sheets-Sheet 5
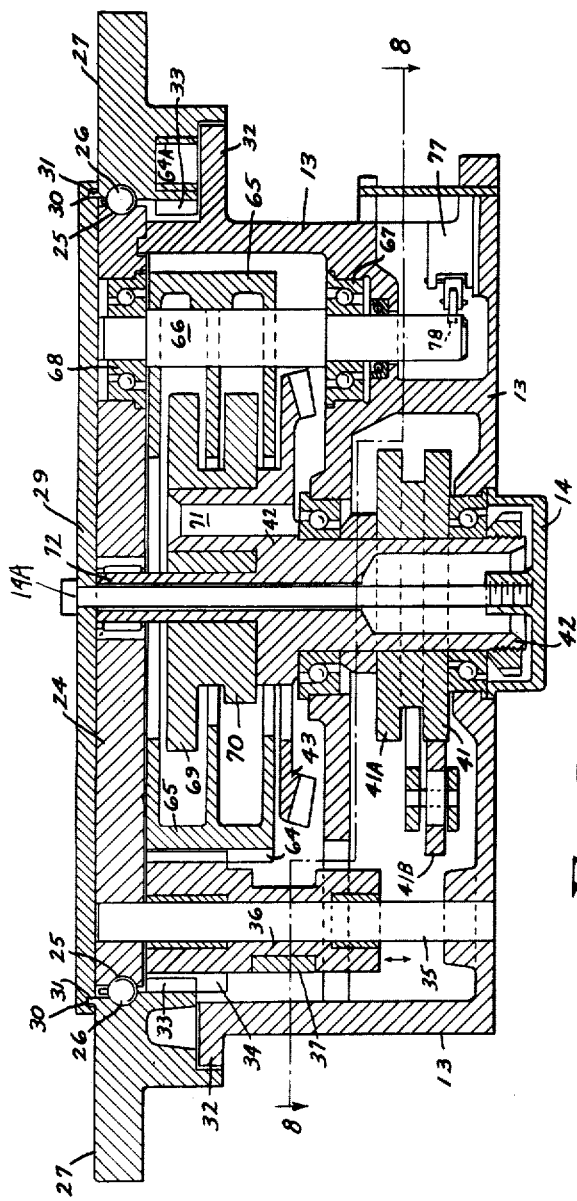
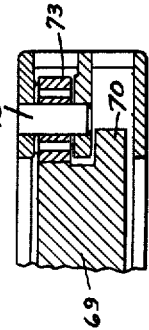
INVENTOR.
LLEWELLYN A. HAUTAU
BY Edward M. Apple
ATTORNEY Patented Feb. 10, 1953

2,627,647

UNITED STATES PATENT OFFICE 2,627,647

INDEXING MACHINE

Llewellyn A. Hautau, Detroit, Mich., assignor of one-half to Charles F. Hautau, Detroit, Mich.

Application June 14, 1951, Serial No. 231,593

8 Claims. (Cl. 29—50)

This invention relates to power tools and has particular reference to a machine for indexing a multiplicity of work stations in a production operation or the like.

An object of the invention is to provide an indexing machine which is propelled by a constant source of power, with means interposed between the source of power and the indexing table for accelerating and decelerating the table and locking the indexing device in predetermined positions.

Previous indexing mechanisms which have been known to the public, such as those employing a Geneva drive, hydraulic cylinders, or solenoids, produce widely spaced peaks and valleys of stress in the mechanism, so that the acceleration and deceleration of the moving mass was difficult to control, with the result that the indexing operations were comparatively slow, jerky, and highly variable in results.

An object of the invention is to obviate the difficulties inherent in previous devices of this character and to provide an indexing mechanism which is constructed and arranged so that the full operating load is carried on the mechanism at all times, thereby eliminating the delays and lags ordinarily occasioned in the use of previous machines.

Another object of the invention is to provide an indexing device which is constructed and arranged so that the period of dwell may be varied to meet the requirements of the operations to be indexed. This is accomplished by use of an automatic clutch and brake arrangement which are actuated by limit switches which are cam controlled within the indexing mechanism.

Another object of the invention is to provide an indexing mechanism in which the work holders are mounted on a ring-like rotatable member which operates with a minimum of inertia.

Another object of the invention is to provide an indexing device which is constructed with a stationary center and a comparatively thin flat ring-like member rotatable about the stationary center.

Another object of the invention is to provide an indexing device which is constructed with a stationary center with an over-hanging rotatable annular table, concentric therewith, and arranged so that work may be performed on said table from all angles.

Another object of the invention is to provide a device of the character indicated, which is constructed and arranged so that the table may be driven by a constant source of energy through a mechanical train which includes a system of cams, each having a constant load thereon during its part of the cycle.

Another object of the invention is to provide an indexing device of the character indicated which is constructed and arranged so that it can be alternately moved and be locked against movement with a minimum of shock.

Another object of the invention is to provide an indexing mechanism of the character indicated which is constructed and arranged so that a power stroke of approximately 210° may be employed as against an average power stroke of approximately 90° as in conventional mechanisms. This also enables the machine to limit its return operation to approximately 90°.

Another object of the invention is to provide an indexing mechanism which is constructed and arranged so that a predetermined dwell may be accomplished at each end of a cycle. This permits the engagement, locking, and removal of the locking member when the device is in a neutral position.

Another object of the invention is to provide an indexing mechanism which is constructed and arranged so that there is a positive control of the annular table by the engagement of a lock-pin while the driving gear is still in mesh and vice versa.

Another object of the invention is to provide an indexing mechanism which is constructed and arranged so that a uniform degree of movement of the work holder to be indexed will be effected.

The foregoing and other objects and advantages of the invention will become more apparent as the description proceeds, reference being made from time to time to the accompanying drawings forming part of the within disclosure, in which drawings:

Fig. 4 is a vertical section taken on the line 4—4 of Fig. 3.

Fig. 5 is a vertical section taken substantially on the line 5—5 of Fig. 3.

Fig. 6 is an enlarged fragmentary detail in section taken substantially on line 6—6 of Fig. 3.

Fig. 7 is a vertical section taken substantially on the line 7—7 of Fig. 3.

Figure 1:
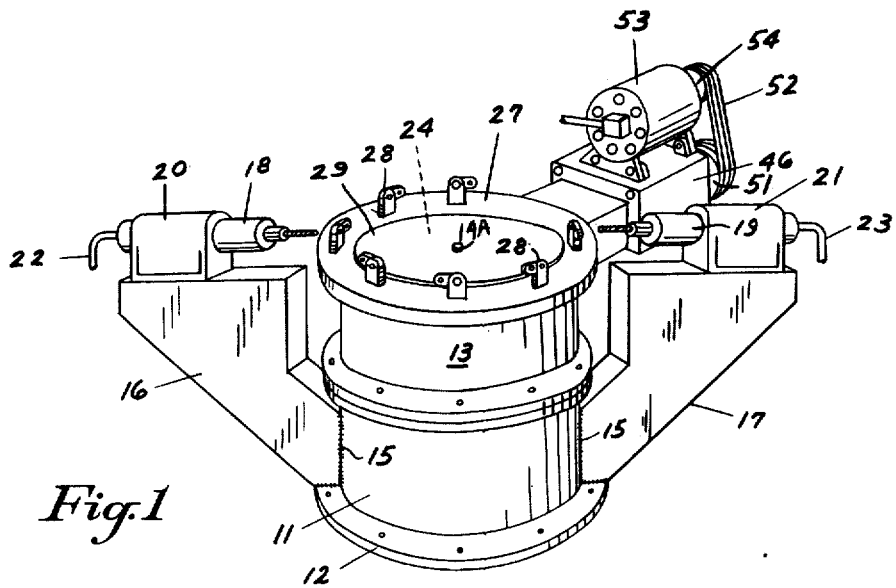
Fig. 1 is a perspective view of the indexing device embodying the invention, with production machine elements attached thereto at various indexing stations.
Figure 2:
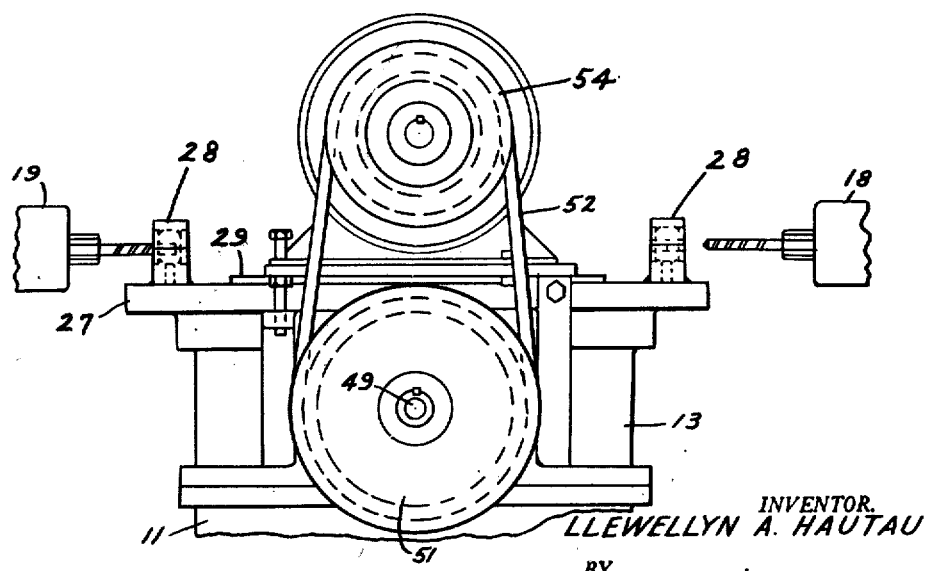
Fig. 2 is an enlarged fragmentary elevational view of the device shown in Fig. 1, and illustrating the driving motor and the flywheel arrangement.

Referring now more particularly to the drawings, it will be understood that in the embodiment herein disclosed, the reference character 11 indicates the base of the machine, which is provided with an apertured flange whereby it may be secured to the floor. The base 11 is provided with a top on which is a flat surface which is adapted to engage the casting 13 which houses the principal parts of the indexing machine. The housing 13 has a centrally positioned depending pilot section 14 (Fig. 4) which is adapted to engage a cut-out portion or pilot hole in the upper flat surface of the base 11. The pilot is locked in position by means of a tie rod 14–A which extends upward through the center of the casting and the drive shaft hereinafter described. Secured to the base 11 by welding or other suitable means as at 15 are supporting arms or brackets 16 and 17 which are adapted to support the production machine elements 18 and 19, which in this embodiment are horizontal drill heads, which are driven by electric motors 20 and 21, which are electrically operated through the leads 22 and 23, which are connected to limit switches controlled by the indexing machine as hereinafter described.

Mounted on the housing 13 is a centrally positioned heavy plate 24 (Fig. 4) which remains stationary at all times. The plate 24 is preferably secured to the housing 13 by machine screws and dowels (not shown). The plate 24 serves as a top cover member for the housing 13 and also serves as a means for anchoring the ends of several shafts and other moving parts hereinafter described. The plate 24 may also serve as a base or a solid center support for a column (not shown) or other means for mounting other types of working heads or production machines.

Figure 8:
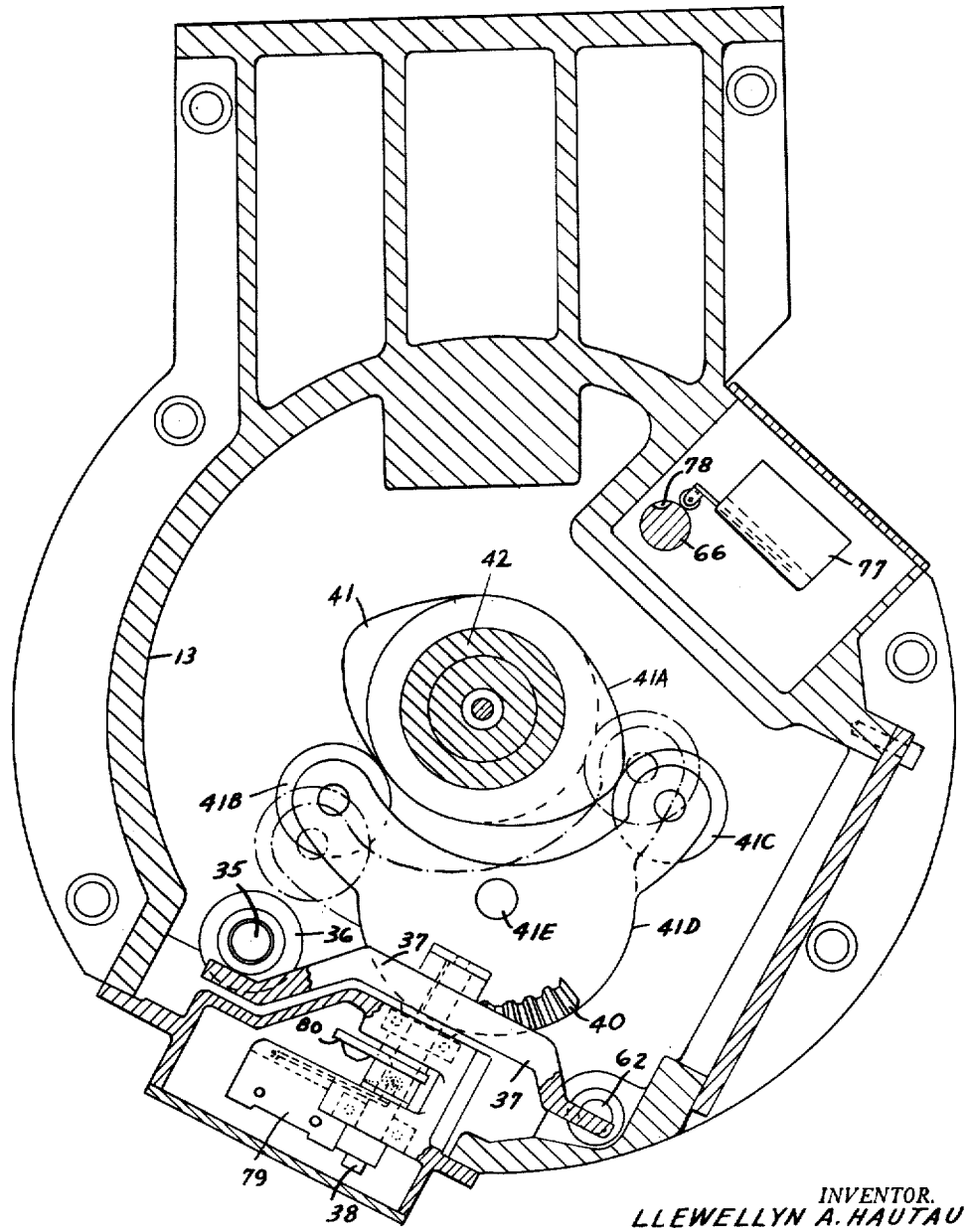
Fig. 8 is a transverse section taken substantially on the line 8—8 of Fig. 7.

The outer periphery of the plate 24 is provided with a raceway 25 in which is mounted a plurality of ball bearings 26 which support the rotatable ring or table 27, on which is adapted to be mounted the work holders or fixtures 28, which are intended to be rotated and indexed into position, so that work may be done upon the pieces held therein in successive manner by the drill heads 18 and 19 (Fig. 1). A cover plate 29 is superimposed on the plate 24 and is adapted to serve as a seal to keep dirt and foreign substances out of the moving parts of the device. The plate 29 is provided on its under surface with a groove 30 (Fig. 7) which is adapted to accommodate a ring 31 formed on the table 27. This also serves as a seal to prevent dirt and the like from entering the working parts of the indexing machine and prevents oil from working out of the device. Any overload of the table 27 on the bearing 26 is picked up by the flange 32 forming part of the housing 13. It will be understood that the clearance between the member 27 and flange 32 is very small and is provided with suitable lubrication. The table 27 is intentionally provided with an overhanging lip which permits the use of other elements beneath it, and also provides room for the attachment thereto of other elements which it might be desired to drive or motivate by the rotation of the table itself as a prime mover. The table 27 (Figs. 4, 5 and 7) is provided with an internal ring gear 33 which is adapted to be driven by a pinion 34 (Fig. 7), which is slidable on a stationary shaft 35. The pinion 34 has attached thereto a grooved collar 36, whereby it is moved vertically on the shaft 35 by means of a rocker arm 37 (Fig. 5) which is pivoted as at 38, on which pivot it is rocked by means of the beveled gears 39 and 40, the latter being actuated by means of cycloidal cams 40 and 41–A (Figs. 4, 7 and 8) which cams are keyed to the drive shaft 42, the latter being rotated by means of gears 43 and 44. The cams, 41 and 41–A, respectively ride on cam follower rollers, 41–B and 41–C, which are pivoted at either end to the bell crank 41–D, which carries a gear segment 40. The bell crank 41–D is pivoted at 41–E. Upon the travel of the rollers 41–B and 41–C over the cams 41 and 41–A a reciprocating motion is given to the rocker arm 37 which moves the pinion 34 and the shot pin 62 into and out of engagement with the table 27.

A beveled gear 44 is carried at the end of a shaft 45, which extends horizontally into the clutch housing 46, where it is keyed to the driven clutch member 47 (Fig. 4). The other driving member 48 of the clutch being carried by a shaft 49 which is supported in a suitable bearing 50, forming part of the clutch housing 46. The shaft 49 is rotated by means of a grooved flywheel 51, which in turn is rotated by V-belts 52 (Fig. 1) which in turn are driven by the electric drive motor 53 through the pulleys 54. The drive shaft 45 (Fig. 4) is provided with a braking member 55, which is secured to the clutch member 47 and is adapted to engage a stationary brake member 56 secured to the clutch housing 46. The clutching and braking members just described comprise parts of a conventional Warner electric clutch and brake assembly and form no part of the invention, except as combined with the other elements herein described. The electric motor 53 is supported by suitable brackets 57 (Fig. 4) which are carried on the clutch housing 46. The shaft 45 rotates in suitable bearings 58, 59 and 60.

As previously indicated, the pinion 34 is slidable on the shaft 35 under the influence of the rocker arm 37. The opposite end of the arm 37 is adapted to engage a slot 61 formed in the shot pin 62, which is slidable in suitable bearings 63, carried by the housing 13. The shot pin 62 is adapted to engage a series of suitable bores 64–A formed in the underside of the table 27 and is adapted to lock the table 27 against rotation while work is being done on the work pieces carried in the fixtures 28. One of the important features of the invention resides in the fact that either the pinion 34, or the shot pin 62, is in engagement with the rotatable table 27 at all times. At a certain neutral point in the cycle both the pinion 34 and shot pin 62 are in engagement with the table 27, and as soon as either becomes disengaged, the other becomes fully engaged, so that there is a positive control at all times of the rotation of the table 27. The pinion 34 is rotated by means of a gear sector 64 (Figs. 3 and 7) with which it is in constant slidable mesh. The gear sector 64 is carried at the end of a bell crank 65 (Fig. 3) which is pivoted on a shaft 66, which is secured near the bottom in a bearing 67 carried in the housing 13 and at the top in the bearing 68 carried in the plate 24.

Figure 3:
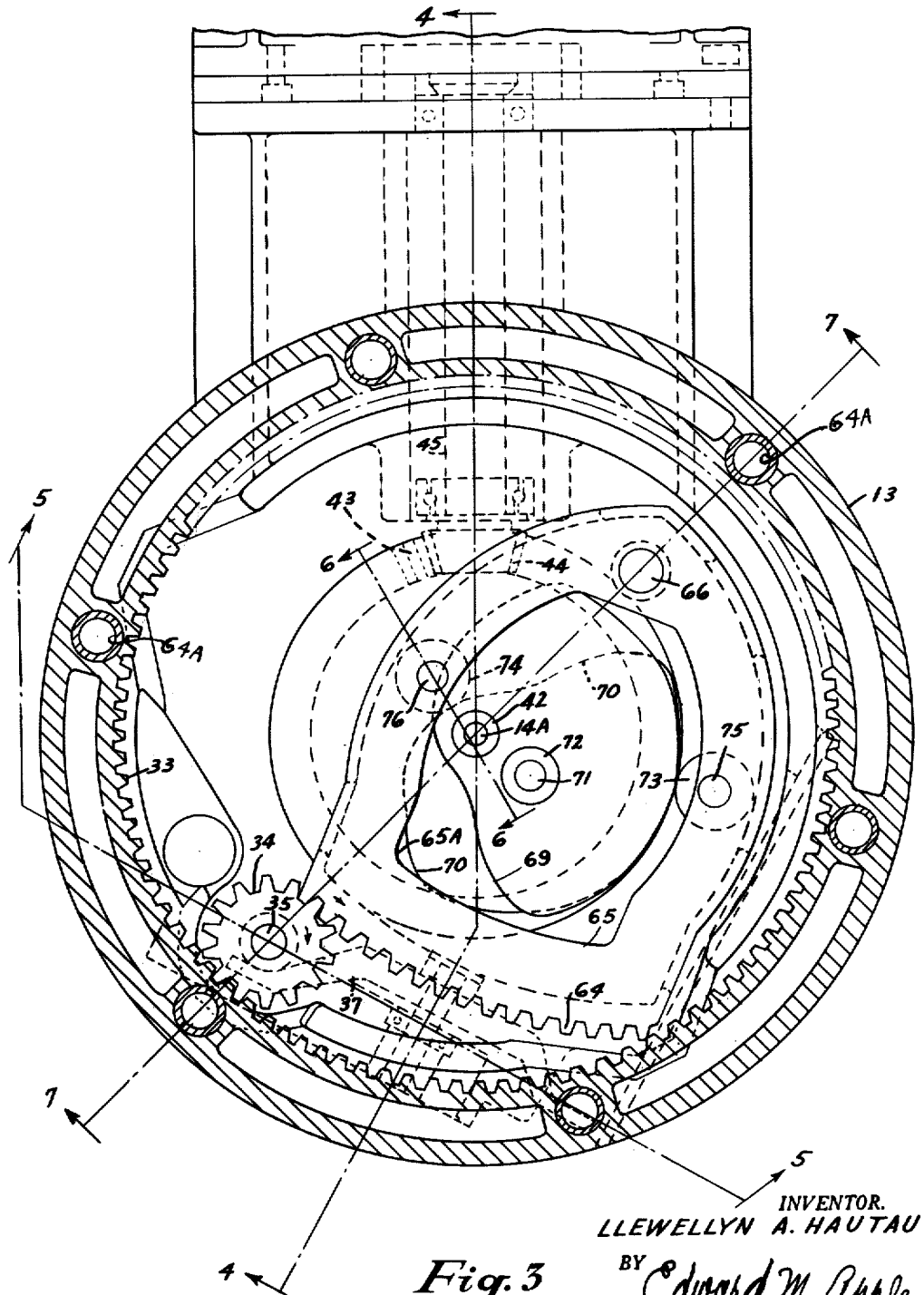
Fig. 3 is a transverse sectional view taken substantially on the line 3—3 of Fig. 4.

It will be understood that the pinion 34 and the gear sector 64 are always in engagement, whereas the engagement of the pinion 34 with the ring gear 33 is intermittent. It being understood, however, that when the shot pin 62 is in full engagement with the table 27, the pinion 34 will be out of engagement with the ring gear 33. The movement of the bell crank 65 with its gear segment 64 is controlled by means of a pair of cycloidal cams 69 and 70 (Figs. 6 and 7) which cams 69 and 70 are secured to the main drive shaft 42 by means of a crank pin 71 and the shaft extension 72 and rotate therewith. It will be noted that the cams 69 and 70 are contained within an opening 65A in the bell crank 65, and respectively contact the cam rollers 73 and 74 (Figs. 3 and 6). The cam rollers 73 and 74 are secured to the bell crank 65 by means of pins 75 and 76. It will be understood that there is a full driving load carried on the cams 69 and 70, the bell crank 65, and the pinion 34, at all times whether the pinion 34 is in driving engagement with the ring gear 33 or on the return portion of the cycle. It will be further understood that the driving portion of the cam 69 operates through approximately 210° of its motion whereas the return portion of the cam 70 operates only during the course of approximately 90° of its rotation. This enables me to use a considerably longer power stroke and a considerably shorter return stroke than has been possible in indexing devices heretofore known to the public. It also enables me to employ controlled dwelling periods at either end of the cycle, so that I can positively lock the table 27 against rotation, and have sufficient time to release the shock pin 62 from the table 27 at the beginning and end of the production work operation. With this controlled dwelling period, I am able to engage the driving pinion 34 with the ring gear 33 of the table 27, and at the same time disengage the shock pin 62 from the table 27 in properly timed sequence.

A limit switch 77 (Figs. 7 and 8) is adapted to be actuated by an indent 78 formed on the shaft 66 and serves to de-clutch the flywheel 51 and energizes the brake 56 as previously described, at the end of the return stroke of the sector 64 which drives the pinion 34. The second limit switch 79 is adapted to be tripped by means of a cam 80 (Fig. 8) carried on the pivot pin 38, upon which the arm 37 is adapted to rock. The limit switch 79 functions to start the work operation between the drilling heads 18 and 19, when the index operation is fully completed.

A typical work cycle of the machine is described as follows:

When the master switch (not shown), which is in series with the limit switches of the working head is closed, a circuit is completed through the brake and clutch elements which engages the flywheel 51, which in turn engages the shaft 45. The rotation of the shaft 45 causes rotation of the beveled gear 44 which in turn drives the main drive shaft 42 through the beveled gear 43. The rotation of the main drive shaft 42 also causes the rotation of the cams 41 and 41-A, the movement of which rocks the bell crank 41-B, causing a rocking of the arm 37 through the beveled gear chain 39 and 40. The rocking of the arm 37 disengages the shot pin 62 from the table 27, at the same time causes the elevation of the pinion 34 into engagement with the ring gear 33 on the table 27. During the action just described, the power cams 69 and 70 were in the dwell position. At the termination of the work stroke of the cams 40 and 41-A, the power cams 69 and 70 start their work, and the bell crank 65 with its gear segment 64 commences its power stroke. Movement of the bell crank 65 and gear segment 64, which at all times is in mesh with the pinion 34, which pinion 34 is now in mesh with the ring gear 33 of the table, causes the table to rotate from one indexing position to the next. Upon the completion of the work stroke of the bell crank 65 the power cams 69 and 70 enter the dwell position, during which dwell position the cams 41 and 41-A then start their work position, causing the rocking of the bell crank 41-D, which causes the pinion 34 to move downwardly and out of engagement with the ring gear 33 on the table 27 and simultaneously therewith moving the shot pin 62 into its locking position with the table 27. At the completion of the power stroke of the cams 69 and 70, the limit switch 79 also completes the circuit, starting the electric motors controlling the working heads. This enables the working heads to start their operation before the return stroke of the power cams 69 and 70. The power cams 69 and 70, the limit switch 79 also completes is compartively shorter than the power stroke. Upon the completion of the return stroke of the cams 69 and 70 the limit switch 77 is actuated by the indent 78 in the shaft 66. This de-energizes the brake and completes the cycle.

Having described my invention, what I claim and desire to secure by Letters Patent is:

1. An indexing machine comprising in combination, a rotatable annular table, a constant source of power for said table, means for intermittently connecting said table to said power source, and locking means for holding said table against rotation when said power source is not connected to said table, said power source communicating with said table through a train which includes a ring gear on said table, and a rotatable driving pinion arranged to slidably engage and disengage said ring gear.

2. An indexing machine comprising in combination, a rotatable annular table, a constant source of power for said table, means for intermittently connecting said table to said power source, locking means for holding said table against rotation when said power source is not connected to said table, said power source communicating with said table through a train which includes a ring gear on said table, and a rotatable driving pinion arranged to slidably engage and disengage said ring gear, there being a locking pin arranged to engage and disengage openings formed in said annular table, said locking pin and said driving pinion being mounted for opposite motion into and out of engagement with said table.

3. An indexing machine comprising in combination, a base having a centrally positioned, upstanding, stationary member, an annular table rotatable about said stationary member and supported thereby, a ring gear on said table, a driving pinion arranged for slidably engaging and disengaging with said ring gear, a locking pin arranged for slidably engaging and disengaging openings in said table, said pinion and said pin being supported for opposite motion to and away from said table, a constant power source, and means for connecting said power source to said driving pinion.

4. An indexing machine comprising in combination, a base having a centrally positioned, upstanding, stationary member, an annular table rotatable about said stationary member and overhanging said base and supported thereby, a ring gear on said table, a driving pinion arranged for slidably engaging and disengaging with said ring gear, a locking pin arranged for slidably engaging and disengaging openings in said table, said pinion and said pin being supported at opposite ends of a rocker arm and arranged for opposite motion to and away from said table, a constant power source, and means for connecting said power source to said driving pinion, said last named means including a bell crank having a gear segment in constant mesh with said pinion, and a cycloidal cam for actuating said segment.

5. An indexing machine comprising in combination, a base having a centrally positioned, upstanding, stationary member, an annular table rotatable about said stationary member and overhanging said base and supported thereby, a ring gear on said table, a driving pinion arranged for slidably engaging and disengaging with said ring gear, a locking pin arranged for slidably engaging and disengaging openings in said table, said pinion and said pin being supported at opposite ends of a rocker arm and arranged for opposite motion to and away from said table, a constant power source, and means for connecting said power source to said driving pinion, said last named means including a bell crank having a gear segment in constant mesh with said pinion, a cycloidal cam for actuating said bell crank, a shaft for rotating said cam, said shaft being driven by a second shaft having an electric clutch for intermittently connecting it to said constant power source.

6. An indexing machine comprising in combination, a base having a stationary central portion, an annular table rotatable about said central portion and overhanging said base, a ring gear on said table, a pinion arranged to move into and out of engagement with said ring gear, a pin mounted for opposite movement with respect to the movement of said pinion and arranged to engage openings in said table, a rocker arm for elevating and lowering said pinion and pin, a bell crank having a gear segment arranged to engage a gear segment on said rocker arm, cams for moving said bell crank, a second bell crank having a gear segment in slidable constant mesh with said pinion, cams for moving said second bell crank, and a shaft for rotating said cams, said last named shaft being driven by a shaft which is arranged for intermittent connection with a constant power source.

7. The structure of claim 6, in which said stationary central portion is provided with a removable plate, there being bearing elements formed on the outer periphery of said plate and the inner periphery of said annular table and rotatable bearings contacting said bearing elements and arranged to rotatably support said annular table.

8. The structure of claim 6, in which the means for connecting said last named shaft to said constant power source include an electrical clutch, and brake assembly, which is controlled by limit switches arranged to be actuated upon the completion of each phase of a work cycle.

LLEWELLYN A. HAUTAU.

REFERENCES CITED

The following references are of record in the file of this patent:

UNITED STATES PATENTS

| Number | Name | Date |
|---|---|---|
| 971,370 | Gridley | Sept. 27, 1910 |
| 1,496,795 | Van Hamersveld | June 10, 1924 |